UNITED STATES PATENT OFFICE.

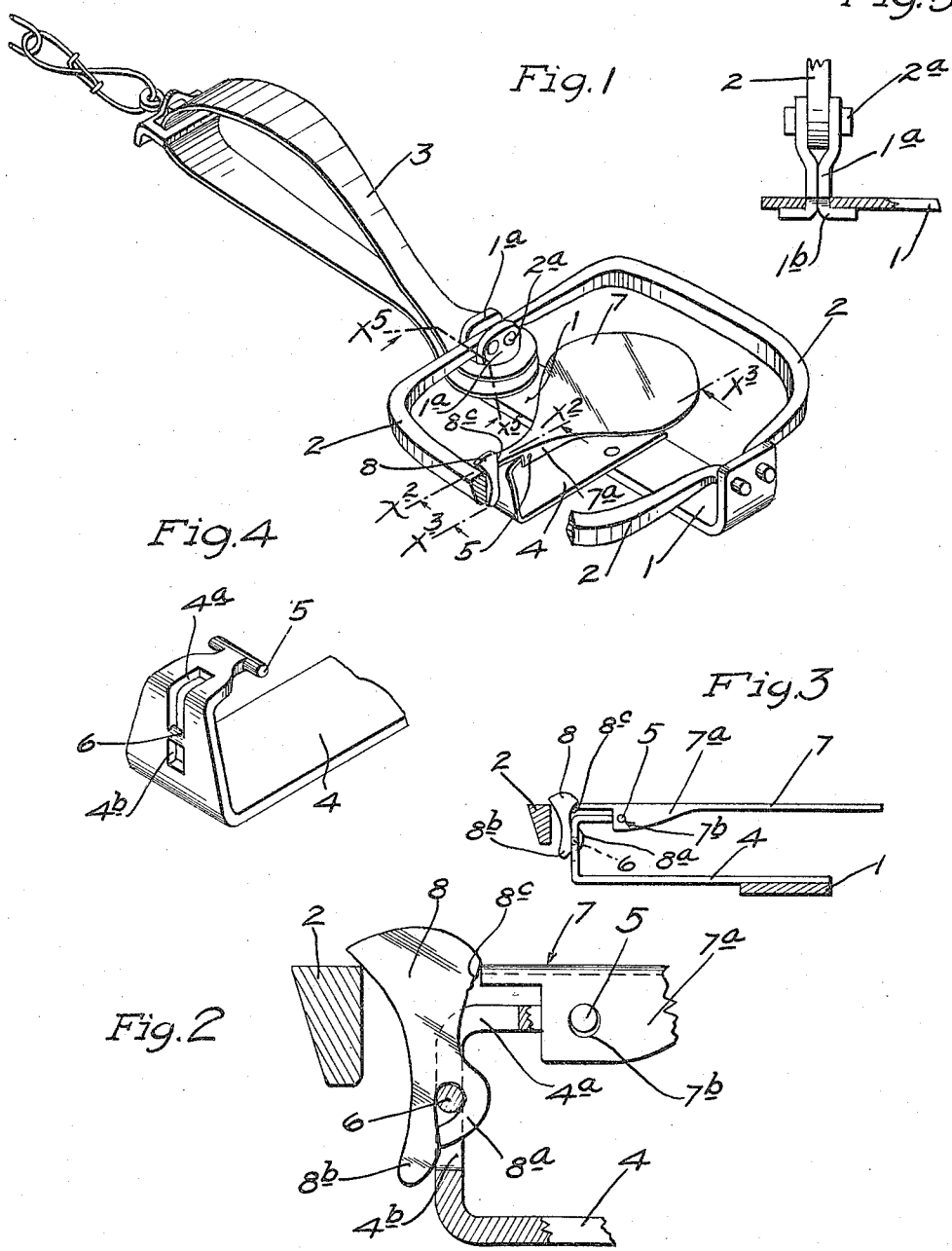

THOMAS E. McDERMOTT, OF MINNEAPOLIS, MINNESOTA.

ANIMAL-TRAP.

1,148,243.  Specification of Letters Patent.  Patented July 27, 1915.

Application filed March 23, 1914. Serial No. 826,492.

*To all whom it may concern:*

Be it known that I, THOMAS E. MCDERMOTT, a citizen of the United States, residing at Minneapolis, in the county of Hennepin and State of Minnesota, have invented certain new and useful Improvements in Animal-Traps; and I do hereby declare the following to be a full, clear, and exact description of the invention, such as will enable others skilled in the art to which it appertains to make and use the same.

My invention has for its object to provide an improved animal trap, and to such ends, the invention consists of the novel devices and combinations of devices hereinafter described and defined in the claims.

In the accompanying drawings which illustrate the invention, like characters indicate like parts throughout the several views.

Referring to the drawings: Figure 1 is a perspective view showing the improved trap with some parts broken away; Fig. 2 is a fragmentary view chiefly in vertical section on the line $x^2$ $x^2$ on Fig. 1, with some parts shown in full; Fig. 3 is a section taken approximately on the line $x^3$ $x^3$ on Fig. 1; Fig. 4 is a perspective view showing a laterally projecting arm of the trap base; and Fig. 5 is a detail in section taken approximately on the line $x^5$ $x^5$ on Fig. 1.

The base of the trap is formed by a flat bar 1 having one end upturned and to which the trap jaws 2 are pivotally connected at one end. The other end of the said bar 1 is provided with a jaw bearing formed by two pressed metal lugs $1^a$ having reduced ends $1^b$ passed through a perforation in the said bar 1 and clenched or bent over to rigidly secure the said lugs thereto. The upper end portions of the said lugs 2 are laterally spaced to receive the adjacent ends of the trap jaws 2 between them and the said trap jaws are pivotally connected thereto by a bolt or rivet $2^a$ (see particularly Fig. 5). The closing of the trap jaws 3 is accomplished by the usual heavy U-shaped spring 3 having perforated ends, the lower perforated end thereof being inserted over the hinge lug $1^a$, and the upper perforated end thereof, working with a cam-like action on the adjacent arms of the jaws 2 and adapted to be moved downward over the said lugs $1^a$, when the trap is set, as shown in Fig. 1.

With the above described connection between the jaws 2 and hinge lugs $1^a$, it is impossible for the jaws to be forced out of pivotal connection with the said lugs by the action of the spring 3 in setting the trap.

Riveted, or otherwise secured to the intermediate portion of the base 1, and projecting laterally from one side thereof, is a trigger supporting bar 4 of special construction. Here it may be stated that all of the parts of the trap are preferably made of steel, although they may be made of any other suitable metal. The outer end of this bar 4 is turned vertically upward and then horizontally inward and the said horizontally inward turned portion is made approximately in the form of a T-head, the lateral projections of which afford trunnions 5. The vertically upturned portion of the bar 4 is provided with upper and lower perforations $4^a$ and $4^b$ that afford a journal or wrist pin 6. In fact, the upper perforation $4^a$ extends into the horizontal vertically offset upper portion of the bar 4, for a purpose which will presently appear.

The numeral 7 indicates the so-called trigger lever, and the numeral 8 a so-called trigger dog. The trigger lever 7 has a flat inner end portion adapted to support the bait and affording a tread plate, and its outer portion is made channel-shaped, that is, is provided with downturned flanges $7^a$. These flanges $7^a$ have perforations $7^b$, through which the trunnions 5 are inserted into the flanges of the said lever and are pressed toward each other in the act of coupling the lever to the upper end of the bar 4. The trigger dog 8 is preferably formed by stamping the same from a quite heavy sheet of steel, and it is provided with an eye formed by bending an elongated lug or finger portion $8^a$ thereof, around the journal or wrist pin 6 of the bar 4. Also, the said dog is provided with a depending stop lug $8^b$. That portion of the dog 8 which is above its pivot flares upwardly, and the inner edge of its flaring portion is preferably formed with serrations $8^c$.

The upper edge portion of the trigger dog 8 is so beveled or curved that it will be forced outward into an operative position, by the outer end of the trigger lever 7, when the inner end of the latter is raised. The width of the flaring upper end portion of the said trigger dog is such that when it is in an operative position, with the outer end of the trigger lever 7 engaged with the serrated surface 8ᶜ thereof, the outer upper end portion of the said trigger dog will overlie the adjacent depressed trap jaw and thereby hold the trap set. Otherwise stated, the flaring upper end of the trigger dog 8, when the trap is set, is wedged between the outer end of the trigger lever and the adjacent jaw, and the tension of the spring 3 acts on the said dog through the locked jaw producing a direct inthrust on the trigger lever toward the axis of the trunnions 5. To obtain this wedging action it is important that the pivot 6 of the dog 8 be below the pivot 5 of the lever 7 and consequently below the set jaw 2 and dog engaging end of the lever 7.

When the bait pan end of the trigger lever 7 is depressed, its outer end will be forced above the trigger dog and the trigger dog will thereby be released and the trap "sprung". Obviously, the farther the outer end of the trigger lever is set downward in engagement with the serrations 8ᶜ of the trigger dog, the greater will be the force required to release or spring the trap. Hence, when the trap is set to catch comparatively large animals, it will not be accidentally tripped off by small animals. This avoids the catching of small and undesirable animals, and also prevents the trap from being accidentally sprung from the falling of sticks or twigs from trees.

The upper extremity of the perforations 4ᵃ and the lower extremities of the perforations 4ᵇ of the upturned portion of the bar 4, will limit the extreme inward and outward movements, respectively, of the upper end portion of the trigger dog, and keep the said dog from falling, at any time, very far from an operative position, but, of course, permits sufficient movements of the dog to release the trap. It is an easy matter to set the trigger dog in an operative position, when the trap jaws are spread or opened, simply by pressing upward on the inner end of the trigger lever 7.

The trap described is of extremely simple construction and small cost, is strong and durable and has no parts that can easily get out of order.

What I claim is:

1. A trap comprising a base, spring-actuated jaws hinged to said base, a trigger dog and a trigger lever, both pivotally connected to said base, said dog having its lower end pivoted at a point materially below the pivot of said lever, and having a flaring upper end arranged to be wedged between the adjacent jaw and adjacent end of said trigger lever, the point of engagement of said jaw and lever with said dog being approximately on the same horizontal line materially above the pivot of said dog.

2. A trap comprising a base, spring-actuated jaws hinged to said base, a trigger dog and a trigger lever, both pivotally connected to said base, said dog having its lower end pivoted at a point materially below the pivot of said lever, and having a flaring upper end arranged to be wedged between the adjacent jaw and adjacent end of said trigger lever, the point of engagement of said jaw and lever with said dog being approximately on the said horizontal line materially above the pivot of said dog, and the said lever being engageable with different points of said dog, and thereby arranged to be set under varying tripping resistance.

3. A trap comprising a base, spring actuated jaws connected thereto, a trigger dog and a trigger lever pivoted on said base, the said dog, when set, being arranged to wedge between the adjacent trap jaw and adjacent end of said trigger lever, and the said dog having serrations for direct engagement with said trigger lever and arranged to set the trigger lever under varying tripping resistance.

In testimony whereof I affix my signature in presence of two witnesses.

THOMAS E. McDERMOTT.

Witnesses:
 HARRY D. KILGORE,
 F. D. MERCHANT.

Copies of this patent may be obtained for five cents each, by addressing the "Commissioner of Patents, Washington, D. C."